Aug. 15, 1950      T. E. TUCKER      2,518,581

LIVE BAIT CONTAINER

Filed Jan. 3, 1947

INVENTOR
THOMAS E. TUCKER
BY *T. A. Whiteley*
Attorney

Patented Aug. 15, 1950

2,518,581

UNITED STATES PATENT OFFICE 2,518,581

LIVE BAIT CONTAINER

Thomas E. Tucker, Minneapolis, Minn.

Application January 3, 1947, Serial No. 720,046

9 Claims. (Cl. 43—56)

My invention is related to an improvement in the construction of a live bait container. In particular it is related to a container having a portion for normally water inhabiting bait and another portion for air inhabiting bait. A feature of the portion construction for normally water inhabiting bait is that the portion is made substantially water-tight for transportation of the bait in a water medium but which may be suspended in a large body of water and adjusted so that fresh water from the larger body may circulate through the portion in which the water inhabiting bait is enclosed, but which may be quickly drained in order to easily reach the bait.

It is frequently necessary for an angler to transport live bait for some time or distance before it is used. In the case of land inhabiting bait, such as earthworms, frogs, or the like, this does not give rise to any particular problem, but in the case of water inhabiting bait, such as minnows, an entirely different problem confronts the angler. Although it is a common practice to transport live minnows in a bucket of water, the water soon becomes stagnant and the minnows either die or become lethargic for the lack of fresh water. In order to keep the minnows in a lively condition, therefore, it becomes necessary to provide a container in which fresh water can be supplied, as for example, by suspending the container in a body of water in such a manner as to permit the circulation of fresh water within the container. While such structures have been known in the prior art, my invention involves a simplified structure involving a container for land inhabiting bait and a container for water inhabiting bait in which the water surrounding the water inhabiting bait may be replenished to sustain the bait and may also be quickly removed from the container.

While it is recognized that it is necessary to keep a plentiful supply of water in the container in which the minnows are enclosed, it is also helpful to the angler to be able to readily grasp a minnow when needed and where there is a large quantity of water in the container this becomes difficult because the minnows will generally be swimming and are difficult to grasp. However, if the water can be quickly removed from the container without the liability of losing the minnows, the condition is improved, and therefore my invention includes a controllable opening in the container which is operable to dispose of the water without loss of bait when the container is lifted from the body of water. This same opening thereafter becomes operative to permit the re-entry of fresh water when the container is returned to the large body of water after a minnow has been secured, to thereby provide a supply of water for the remaining minnows in the container.

An object of my invention is to provide a live bait container for receiving both normally land inhabiting bait and water inhabiting bait, which is provided with means permitting the circulation of air in a suitable form in contact with the respective forms of bait.

Another object is to provide a live bait container for transporting water inhabiting bait in which the container is provided with valve means to permit the entrance and exit of fresh water through a lower portion of the container.

Another object is to provide a live bait container which is adapted to be floatingly suspended in a body of water to permit circulation of water through the container without permitting the escape of the bait but from which the water can be quickly removed in order to grasp the bait.

A further object is to provide in a live bait container, a two-position valve means for controlling the flow of water through the container when the same is suspended in a larger body of water, and in which means are provided for maintaining the valve in each of its two positions.

Other and further objects will become apparent from the following description and claims, and from the appended drawings in which:

Figure 1:
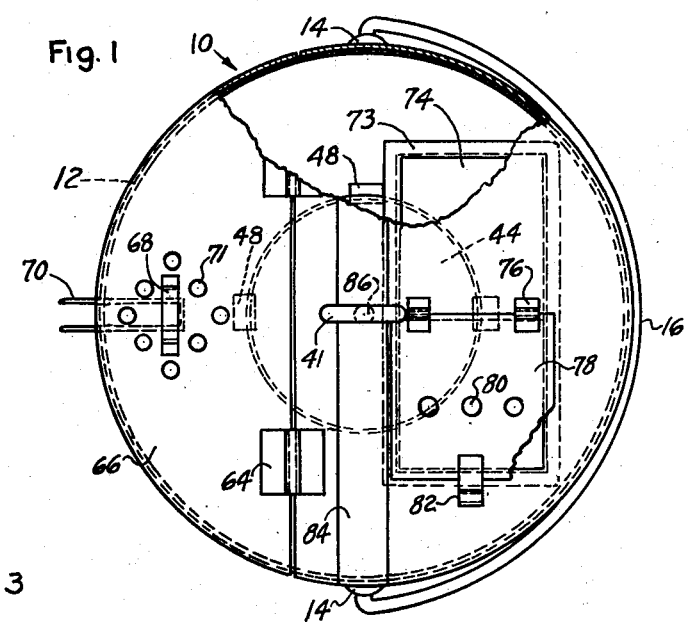
Fig. 1 is a plan view of a live bait container with parts broken away to show the interior.

Referring now to the drawings, the invention will be described in detail.

Figure 2:
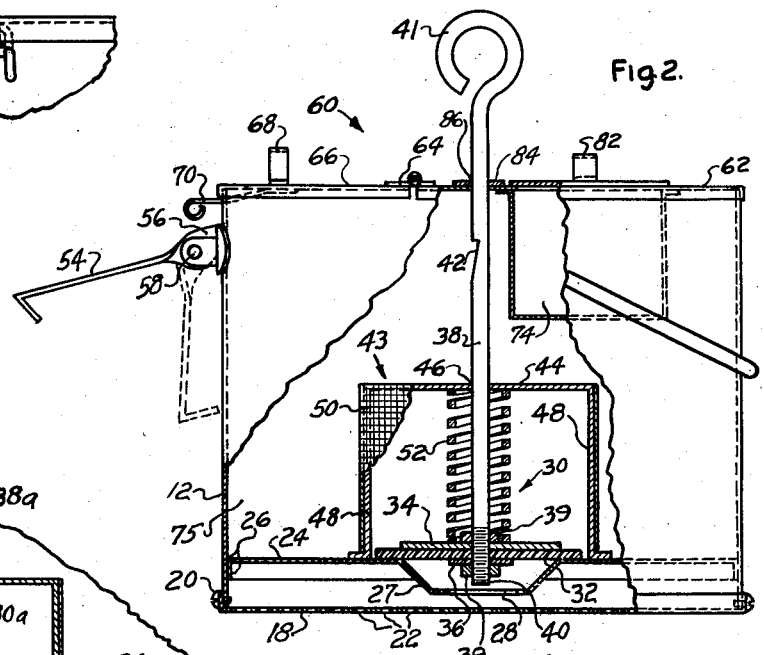
Fig. 2 is a side elevation of the container shown in Fig. 1, with some parts broken away and others shown in cross-section.

General reference numeral 10 indicates a bait container or bucket having a continuous side wall portion 12 to which is attached a pair of ears 14 for receiving the inwardly bent ends of a bail 16. Adjacent its lower portion, as shown in Fig. 2, bucket 10 is provided with a base portion 18 which is fastened to the side wall 12 by fastening means 20. Base portion 18 is provided with a plurality of perforations 22. Within its interior, bucket 10 is provided with an intermediate member 24 having a peripheral flanged portion 26 joined to side wall 12. Intermediate member 24 has a centrally depressed portion 27 which contains an aperture 28.

Mounted within bucket 10 is a movable valve mechanism indicated by the general reference numeral 30. Valve mechanism 30 consists of a large disk 32 formed of resilient material such as rubber, or the like, and which is adapted to move with relation to intermediate member 24 so as to engage the upper periphery of depressed portion 27, to control the flow of fluid through aperture 28. A large metal disk 34 is mounted on the upper side of resilient disk 32, and a metal washer 36 is mounted on the lower surface of resilient disk 32. The several disks are mounted on one end of a rod 38 and rigidly secured thereto by a pair of nuts 39 which engage the threaded portion 40 on the lower extremity of rod 38. Rod 38 is provided with a handle 41 on its upper extremity, and intermediate its two ends rod 38 is provided with a cut-out portion 42 for latching the valve mechanism 30 in an open position as will be explained hereinafter.

An enclosure indicated by the general reference numeral 43 is provided on the upper surface of intermediate member 24 about valve mechanism 30 to prevent the bait from being injured by the valve mechanism. A rigid disk 44 having a central aperture 46 to accommodate rod 38 is supported on intermediate member 24 by a plurality of legs 48. A porous sleeve 50 formed of screen or other perforated material, fits over the several legs 48. A strong compression spring 52 is located within the enclosure 43 with one end in engagement with disk 34 and the other end in engagement with disk 44, in such a manner as to bias valve mechanism 30 to a normally closed position.

A hook 54 is attached to side wall portion 12 by a bracket 56 through a pivotal conection 58 to provide a pivotal means for rigidly supporting the bucket on the side of a boat or the like, and will in general be used during the period when the angler is selecting a piece of bait.

Figure 3:
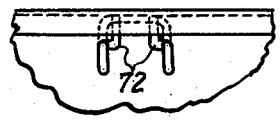
Fig. 3 is a side elevation of details shown in Fig. 1.

Fastened to the upper edge of side wall portion 12 is a top enclosure indicated by the general reference numeral 60. Top enclosure 60 consists of a portion 62 which is permanently attached to side wall portions 12 and carries a pair of hinges 64, to which is attached a movable lid 66. Movable lid 66 has a handle 68 and a U-shaped latching mechanism 70 which is adapted to engage in a pair of slots 72 located in side wall member 12 as shown in Fig. 3, to latch the movable lid 66 in a closed position. A plurality of apertures 71 are provided in a movable lid 66 to permit the entry of air into the general interior of the bucket which is hereinafter referred to by reference numeral 75. Supported on the lower surface of portion 62 by a peripheral flange 73 is an air inhabiting bait container 74 for receiving bait such as earthworms, frogs, or the like. Supported by a pair of hinges 76 which are fastened to portion 62, is a movable lid 78 which permits access from the top of the structure into the air inhabiting bait container 74. Lid 78 is provided with a plurality of air admitting apertures 80 and a handle 82. Extending across the upper surface of portion 62 is a cross-member 84 having a central aperture 86 to accommodate rod 38 and with which the cut-out portion 42 of rod 38 may be engaged to maintain the valve in an open position when rod 38 is lifted.

Figure 4:
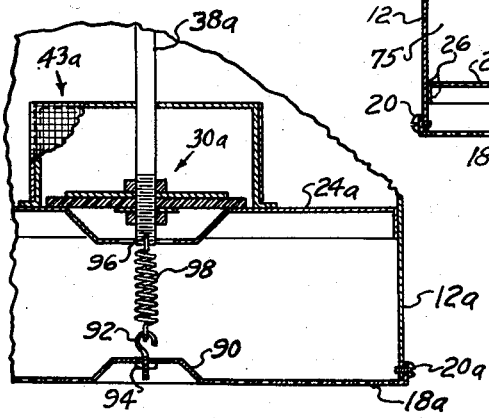
Fig. 4 is a cross-section of a modification of certain features shown in Fig. 2.

Referring now to Fig. 4, is disclosed a modification of the structure shown in Fig. 2 where a tension spring is used to maintain the valve 30 in a closed position in place of compression spring 52 as previously disclosed. Side wall portion 12a has mounted on its lower extremity a perforated base member 18a which is secured to side wall 12a by fastening means 20a. An upwardly extending indentation 90 is provided in portion 18a within which is secured a hook-shaped member 92 by a nut 94 positioned on the lower surface of base member 18a within the indentation 90. Intermediate member 24a carries an enclosure 43a and is in all respects similar to intermediate member 24 except that it is spaced a greater distance from base portion 18a. Rod 38a which is manually operated is provided with a central aperture 96 adjacent its lower extremity which receives one end of a tension spring 98, the other end of which is connected to hook member 92. It is the purpose of tension spring 98 to bias valve mechanism 30a to a normally closed position.

In practice, the container of either modification is used for transporting both normally land inhabiting bait and normally water inhabiting bait. The land inhabiting bait may be placed in container 74 and when lid 78 is closed, apertures 80 will permit the entry of air in and about the bait to sustain its life. With the valve mechanism 30 in a closed position with respect to the indentation 27 and aperture 28 of intermediate member 24, a quantity of water inhabiting bait may be placed in compartment 75 and a quantity of water may be placed therein for sustaining the life of this bait during periods of transportation away from a large body of water. When the angler arrives at the place where he will do his fishing, as for example, a boat from which he will fish, the container is suspended over the side of the boat by means of a rope attached to bail 16. Because compartment 74 is air-tight, the container 10 will be floatingly suspended in the water so that the land inhabiting air sustained bait therein will not drown. To provide fresh water for sustaining the water inhabiting bait, the valve mechanism 30 is opened by pulling up on rod 38 until the cut-out portion 42 engages with the aperture 86 in cross-member 84. This will permit water from the large body, such as a lake, to circulate through compartment 75 so as to provide fresh water for the water inhabiting bait therein. When the angler is ready to select a minnow, or other form of water inhabiting bait, it is only necessary to lift bucket 10 by bail 16 and engage hook 54 on the side of the boat whereupon the water in compartment 75 will quickly run out past valve 30 and through aperture 28, whereupon the angler may grasp a minnow and thereafter return the bucket to the large body of water where compartment 75 will again be substantially filled with water which has entered through aperture 28 and past valve 30. However, by virtue of the fact that compartment 74 is sealed from compartment 75, the container is not permitted to sink in the water to the extent of filling compartment 74. Therefore, land inhabiting air sustained bait may be maintained in a proper condition in compartment 74, and water inhabiting bait may be properly maintained in compartment 75. It will be particularly noted that bucket 10 is provided with a perforated base portion 18 which is separated from the intermediate member 24 with which valve mechanism 30 cooperates. The purpose of the perforated base 18 is to prevent injury to the valve mechanism when the bucket is placed on a hard surface, or in soft mud or the like.

The advantages of my invention will be apparent to those skilled in the art and in as much as numerous substitutions may be made, I do not wish to be restricted to the extent of the illustration, but rather only to the extent of the appended claims.

I claim:

1. A live bait container comprising, a bucket having a continuous side wall and a perforated base member, an intermediate member having an aperture therein, said member being supported by said side wall, a movable valve associated with said aperture for closing the same, manually operable means for moving said valve to an open position, and a spring connected to said valve and said base member for biasing said valve to a closed position.

2. A live bait container, comprising a perforate bottom wall, a continuous side wall joined to the bottom wall, a partition within said container joined to said side wall and spaced upwardly in a plane parallel with the bottom wall, said partition having an aperture therein for the passage of water with respect to the opposite sides of said partition, valve means cooperable with said aperture for closing the same, said container being adapted to receive live water inhabiting bait in the area above said partition, and a perforate member mounted on the upper surface of said partition and surrounding said valve to prevent bait from gaining access to the valve.

3. A live bait container, comprising a perforate bottom wall, a continuous side wall joined at its lower extremity to the bottom wall, a top secured to the upper extremity of the side wall, a watertight compartment positioned within the container and supported by the top and being effective to floatingly support the container in a body of water, a partition within said container joined at its periphery to the side wall at a point intermediate the bottom wall and the top, said partition having an opening for the passage of water through the partition, valve means cooperable with the partition for closing said opening, said container being adapted to receive live water inhabiting bait above said partition, and a perforate member mounted on the upper side of said partition and surrounding the valve to prevent the bait from gaining access to the valve.

4. A live bait container, comprising a bait bucket formed of a continuous side wall and a perforate bottom wall, a false bottom supported in the interior of the bucket in a plane parallel with the perforate bottom wall and forming the lower wall of an enclosure for containing normally water inhabiting bait, said false bottom having an opening therein, a movable valve associated with said opening for closing the same, a perforate enclosure supported by the false bottom and surrounding one side of the valve, a movable rod connected at one end with the valve and extending through said enclosure beyond the upper edge of the side wall of the bucket to provide manual means for moving the valve between open and closed positions, a spring operatively connected at one end to said valve for biasing the same to a closed position, and means carried by the bucket for engaging a portion of said rod to maintain the valve in an open position.

5. A live bait container, comprising a bait bucket formed of a continuous side wall and a perforate bottom wall, a false bottom supported in the interior of the bucket in a plane parallel with the perforate bottom wall and forming the lower wall of an enclosure for containing normally water inhabiting bait, said false bottom having an opening therein, a movable valve associated with said opening for closing the same, a perforate enclosure supported by the false bottom and surrounding one side of the valve, a movable rod connected at one end with the valve and extending through said enclosure beyond the upper edge of the side wall of the bucket to provide manual means for moving the valve between open and closed positions, a spring located within said enclosure and operatively connected at one end to said valve for biasing the same to a closed position, and means carried by the bucket for engaging a portion of said rod to maintain the valve in an open position.

6. A live bait container, comprising a bait bucket formed of a continuous side wall and a perforate bottom wall, a false bottom supported in the interior of the bucket in a plane parallel with the perforate bottom wall and forming the lower wall of an enclosure for containing normally water inhabiting bait, said false bottom having an opening therein, a movable valve associated with said opening for closing the same, manually operable means connected to said valve for moving the same to an open position, a spring operatively connected at one end to said valve for biasing the same to a closed position, a cover secured to the upper edge of the side wall of the bucket, and a container for normally land inhabiting bait secured to the cover and sealed from the enclosure for the water inhabiting bait, said container being adapted to floatingly support the bucket in a body of water.

7. A live bait container, comprising a bait bucket formed of a continuous side wall and a perforate bottom wall, a false bottom supported in the interior of the bucket in spaced relation to the perforate bottom wall and forming the lower wall of an enclosure for containing normally water inhabiting bait, said false bottom having an opening therein, a movable valve associated with said opening for closing the same, a perforate housing supported on the upper side of the false bottom and enclosing one side of the valve to prevent the water inhabiting bait from gaining access to said opening, a manually operable rod connected at one end to said valve and extending through said enclosure beyond the upper edge of the side wall of the bucket to provide manual means for moving the valve between open and closed positions, a spring operatively connected at one end to said valve for biasing the same to a closed position, a cover secured to the upper edge of the side wall of the bucket, and a container for normally land inhabiting bait secured to the cover and sealed from the enclosure for the water inhabiting bait, said container being adapted to floatingly support the bucket in a body of water.

8. A live bait container, comprising a bait bucket having a perforate bottom wall, a false bottom secured in the interior of said bucket in spaced relation to said bottom wall, said false bottom having an aperture therein, a manually operable valve structure cooperable with the aperture in said false bottom for controlling the flow of water with respect to the opposite sides of the false bottom, a member mounted on the upper side of said false bottom having a perforate surface surrounding a portion of the valve structure to prevent water inhabiting bait within the bucket and on the upper side of the false bottom from gaining access to the aperture, and a spring operatively connected at one end with one of said members and at its other end with said valve structure for biasing the latter towards the false bottom.

9. A live bait container, comprising a bait bucket formed of a continuous side wall, a perforate plate secured at its periphery to the lower extremity of the side wall, a second plate secured at its periphery on the inner surface of the side wall in a plane parallel with the first plate and spaced upwardly from the first plate, said second plate having a central opening therein, a movable valve associated with the opening in said second plate for closing the same, manually operable means connected to said valve for moving the same to an open position, and a spring operatively connected at one end to said valve for biasing the same to a closed position.

THOMAS E. TUCKER.

REFERENCES CITED

The following references are of record in the file of this patent:

UNITED STATES PATENTS

| Number | Name | Date |
|---|---|---|
| 134,342 | Wood | Dec. 24, 1872 |
| 574,049 | Trigg | Dec. 29, 1896 |
| 1,306,150 | Kessler | June 10, 1919 |
| 1,327,708 | Guy | Jan. 13, 1920 |
| 1,388,187 | Marble | Aug. 23, 1921 |
| 1,465,814 | Forsburg | Aug. 21, 1923 |
| 1,471,475 | Demuth | Oct. 23, 1923 |
| 1,476,230 | Thompson | Dec. 4, 1923 |
| 1,526,104 | Tuley | Feb. 10, 1925 |
| 1,576,688 | Thompson | Mar. 16, 1926 |